United States Patent
Overton et al.

(10) Patent No.: US 9,097,089 B2
(45) Date of Patent: Aug. 4, 2015

(54) SUPPLYING POWER TO UNDERWATER DEVICES

(75) Inventors: Paul Overton, Bristol (GB); Andrew Robert Packham, Chippenham (GB)

(73) Assignee: GE OIL & GAS UK LIMITED, Bristol (GB)

( * ) Notice: Subject to any disclaimer, the term of this patent is extended or adjusted under 35 U.S.C. 154(b) by 805 days.

(21) Appl. No.: 13/188,710

(22) Filed: Jul. 22, 2011

(65) Prior Publication Data

US 2012/0032523 A1    Feb. 9, 2012

(30) Foreign Application Priority Data

Aug. 3, 2010  (EP) .................................... 10171765
Nov. 2, 2010  (EP) .................................... 10189694

(51) Int. Cl.
*H01F 38/14*   (2006.01)
*H02J 17/00*   (2006.01)
*E21B 33/035*  (2006.01)
*H02J 5/00*    (2006.01)

(52) U.S. Cl.
CPC ............. *E21B 33/0355* (2013.01); *H02J 5/005* (2013.01); *H01F 38/14* (2013.01)

(58) Field of Classification Search
CPC ....... E21B 33/0355; H02J 5/005; H01F 38/14
USPC ........................................................ 307/104
See application file for complete search history.

(56) References Cited

U.S. PATENT DOCUMENTS

| 4,309,734 | A | 1/1982 | Warren |
| 5,052,941 | A * | 10/1991 | Hernandez-Marti et al. . 439/194 |
| 2002/0128690 | A1* | 9/2002 | Zarinetchi et al. .............. 607/33 |
| 2004/0238165 | A1 | 12/2004 | Salamitou et al. |
| 2007/0107907 | A1* | 5/2007 | Smedstad et al. ............. 166/357 |
| 2007/0125530 | A1 | 6/2007 | Lerche et al. |
| 2010/0036773 | A1* | 2/2010 | Bennett .......................... 705/67 |
| 2010/0072825 | A1* | 3/2010 | Azancot et al. ............... 307/104 |

FOREIGN PATENT DOCUMENTS

| CN | 101404420 A  | 4/2009 |
| EP | 2148404 A2   | 1/2010 |
| GB | 2416626 A    | 2/2006 |
| WO | 2004067901 A1| 8/2004 |

OTHER PUBLICATIONS

Partial EP Search Report issued in connection with EP Application No. 10186964.2 on Apr. 18, 2011.
EP Search Report issued in connection with EP Application 10189694 on Jul. 5, 2011.
Partial EP Search Report issued in connection with EP Application 10171765 on Jan. 21, 2011.

(Continued)

*Primary Examiner* — Jared Fureman
*Assistant Examiner* — Joel Barnett
(74) *Attorney, Agent, or Firm* — GE Global Patent Operation

(57) ABSTRACT

A method of supplying electrical power to at least one device at a tree of an underwater fluid extraction well is disclosed. The method comprises using magnetic resonance coupling for wirelessly transmitting power from a supply to each device.

16 Claims, 5 Drawing Sheets

(56) References Cited

OTHER PUBLICATIONS

Partial EP Search Report issued in connection with EP Application 10189694 on Jan. 21, 2011.

Unofficial English Translation of CN Office Action issued Jun. 4, 2014 in connection with corresponding CN Patent Application No. 201110230113.7.

* cited by examiner

SUPPLYING POWER TO UNDERWATER DEVICES

BACKGROUND OF THE INVENTION

1. Field of the Invention

Embodiments of the present invention relate to the supply of electrical power to underwater devices, in particular those at a tree of an underwater fluid extraction well.

2. Description of the Prior Art

On a subsea fluid extraction well Christmas tree, the supply of electrical power to pressure and/or temperature (P/T) sensors and to directional control valves (DCVs) within a subsea control module (SCM) is typically supplied from a subsea electronics module (SEM). Likewise, electrical power to sensors mounted on the Christmas tree itself, external to the SCM, are also fed from the SEM via the SCM. Such power is supplied via simple wiring. However, the wiring, along with the connectors which have to operate under high barometric pressures and low temperatures, are expensive. Embodiments of the present invention provide a cheaper alternative to the power wiring and connectors.

BRIEF SUMMARY OF THE INVENTION

According to embodiments of the present invention, there is provided a method of supplying electrical power to at least one device at a tree of an underwater fluid extraction well, the method comprising using magnetic resonance coupling for wirelessly transmitting power from a supply to each device.

According to embodiments of the present invention, there is provided an apparatus for supplying electrical power to at least one device at a tree of an underwater fluid extraction well, the apparatus comprising circuitry configured for using magnetic resonance coupling for wirelessly transmitting power from a supply to each device.

There could be a plurality of such devices, each powered via a respective receiver circuit coupled by magnetic resonance coupling with a transmitter circuit of the supply. In this case power from the supply could be modulated by a code unique to at least one of the devices, detection of the code at the receiver circuit of the device causing power to be supplied to the device. Alternatively, a code unique to at least one of the devices could be transmitted by wireless means to the receiver circuit of the device, detection of the code at the receiver circuit of the device causing power to be supplied to the device.

There could be a plurality of the supplies each resonant at a respective one of a plurality of frequencies and a plurality of the devices each powered by a respective receiver circuit resonant at a respective one of the frequencies.

At least one such supply could be in a subsea control module of the tree.

Additionally or alternatively, at least one such supply could be in a subsea electronics module of a subsea control module of the tree. In these cases, at least one such device could be in the subsea control module and/or at least one such device could be located externally of the subsea control module.

At least one such supply could be mounted externally of the tree, for example on a remotely operated vehicle or adapted for carrying by a diver, or mounted at a surface location.

At least one such device could comprise a sensor.

At least one such device could comprise a directional control valve.

The invention reduces the need for expensive wiring and feed through connectors between devices in an SCM and external devices requiring power to operate.

DETAILED DESCRIPTION OF THE INVENTION

The concept of transmitting electric power by magnetic resonance is as old as the discovery of electricity in that Tesla himself proposed the technique. In practice, the technique has had no place in electrical engineering technology until recent times, mainly because the cheap electronics required to achieve power transfer by magnetic resonance have only recently become available.

The basic principle of magnetic resonance involves a transformer where the core is not a ferrous material but air (or a vacuum). Within the transformer, the primary and secondary windings are resonant at the operating frequency of the primary current supplied from a source. The high 'magnetic gain' i.e. 'High Q' of the resonant secondary winding allows it to be separated from the primary winding by several meters, thus resulting in power transmission wirelessly.

Figure 1:
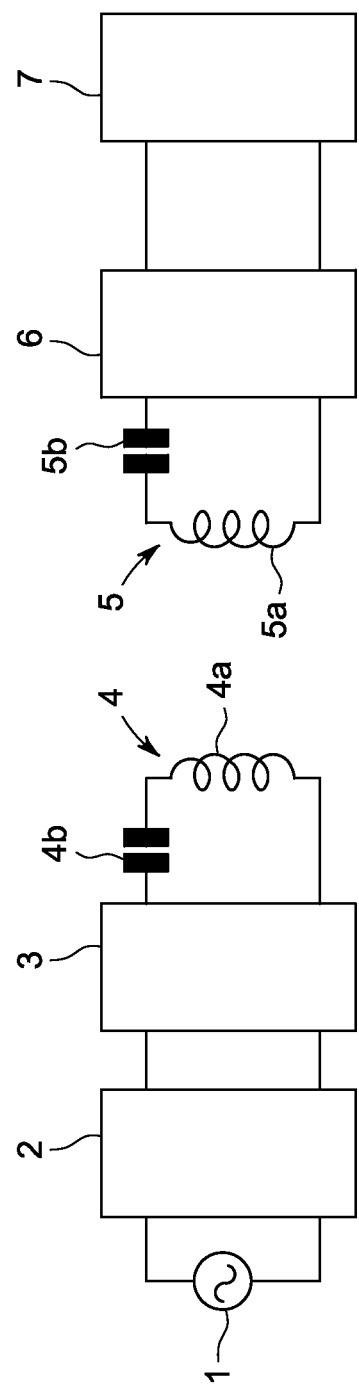
FIG. 1 is a figure for illustrating the principle of the embodiments of the present invention.

The technique has been recently demonstrated by the company Witricity to charge laptop and mobile phone batteries without a wired connection from the power source to the appliance. Typically the frequency of the power source deemed to be practical and effective is of the order of 10 MHz, and is typically provided by an electronic sine wave oscillator and power output stage. FIG. 1 illustrates the principle underlying the invention, in which a standard 50 Hz power source 1 feeds an AC to DC power supply 2 which feeds an oscillator 3, operating at a frequency which matches the resonant frequency of a primary circuit 4 comprising a primary winding 4a in series with a capacitor 4b. The primary circuit 4 functions as a magnetic antenna. At the receiving end, a voltage is induced in a secondary winding 5a of a secondary circuit 5 comprising the winding 5a and a series capacitor 5b. The secondary circuit 5 is resonant at the same frequency as the primary circuit 4. The induced voltage is rectified by a rectifier 6 to provide the required DC supply for equipment 7 which could comprise sensors and/or DCVs.

Figure 2:
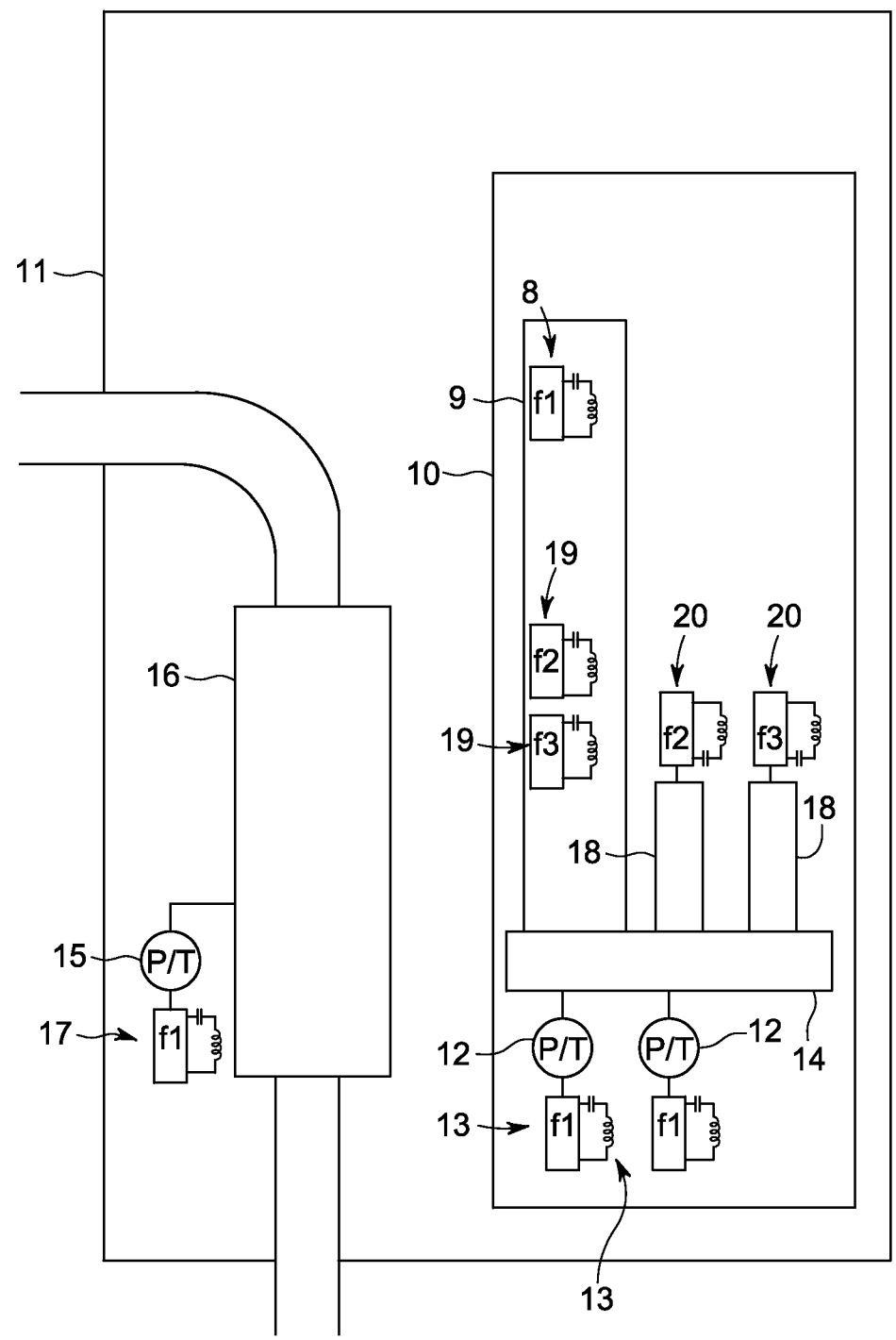
FIG. 2 is a schematic diagram of an embodiment of the invention.

FIG. 2 shows a typical arrangement of an embodiment of the invention. A wireless magnetic power supply 8 (operating at frequency f1) including a resonant primary circuit is housed in an SEM 9 located within an SCM 10 on a subsea well tree 11 of a subsea fluid extraction well. Sensors, as shown P/T devices 12, are each connected to a respective one of resonant magnetic receivers 13 each including a resonant secondary circuit and a rectifier, also operating at frequency f1. Thus, the single wireless magnetic power supply 8 supplies electric power wirelessly to a plurality of P/T devices 12 within the SCM 10, typically monitoring hydraulic control supplies on an SCM distribution manifold 14. Also, the supply 8 supplies electric power wirelessly to at least one other, external P/T device 15, typically monitoring the production fluid within the production flow control line 16 on the well tree 11, via a respective secondary receiver 17 including a resonant secondary circuit resonant at the frequency f1.

DCVs 18, again within the SCM 10 and typically mounted on the hydraulic manifold 14, are supplied with electric power individually as required by the control circuitry of the SEM 9. Thus, for a wireless power feed to the DCVs 18, each SEM control output feeds an individual wireless magnetic power supply 19, operating at a frequency that matches the resonant frequency of the secondary circuit of a respective magnetic secondary receiver 20. Since the Q of the wireless power transmitting and receiving devices is high, the power transmitting links to the DCVs can operate at different frequencies, thus permitting individual control of the DCVs from the Individual control outputs from the SEM. Only two DCVs 18 with receivers 20 whose secondary circuits are resonant at frequencies f2 and f3 respectively are shown in FIG. 2 for diagrammatic simplicity.

Figure 3:
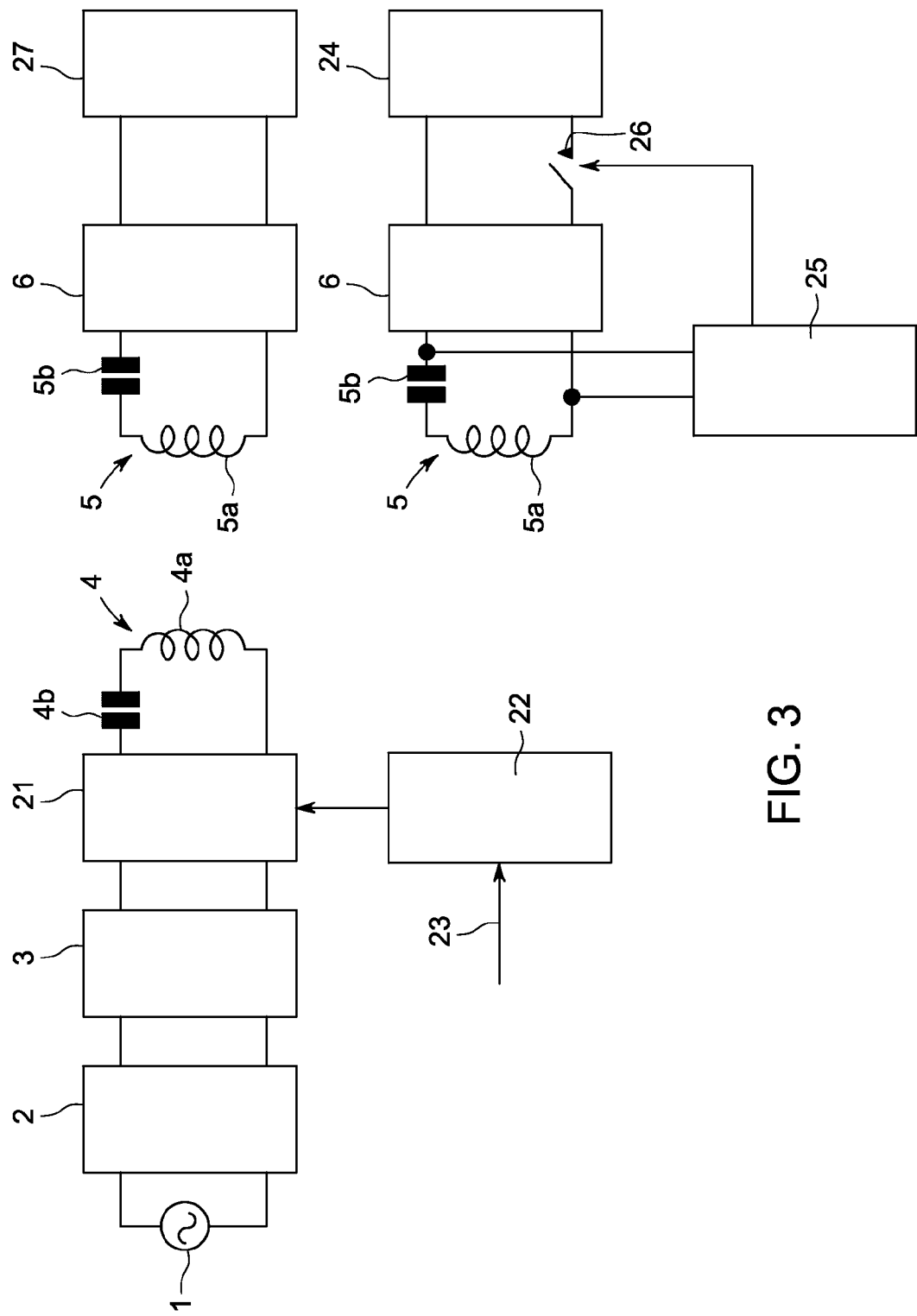
FIG. 3 schematically illustrates another embodiment of the invention.

An alternative arrangement for operating DCVs is to have a common wireless magnetic power supply at a single frequency and operate individual DCVs by modulating the supplied power with an identification code. This technique has the advantage of only needing a single wireless magnetic power supply for all DCVs and wireless powered sensors, and a common design of DCV wireless magnetic receiver. The principle of the technique is illustrated in FIG. 3 in which items which correspond with those in FIG. 1 have the same reference numerals as in FIG. 1. The output of the oscillator 3 of a wireless magnetic power supply connects to a resonant magnetic primary circuit 4 via a modulator 21, which superimposes a digital code on the oscillator output. The code is generated in a code generating circuit 22, which generates the code appropriate for a specific DCV according to a demand on a line 23 from DCV control circuitry in the SEM. The wireless magnetic power receiver for each DCV 24 is fitted with a demodulator and decoder circuit 25. When the code transmitted by the wireless power supply matches that pre-set in the demodulator and decoder circuit 25, the output of the receiver is connected to the DCV via a switch 26, to operate the DCV 24. If the decoding of the transmitted code is effected by a processor, then the code can be inserted with software allowing a standard device design to be employed for all DCVs. Sensors, such as P/T sensors 27 are powered from wireless magnetic power receivers 5, 6 without demodulator and decoder circuits, deriving their power from the common shared wireless magnetic power supply. The primary disadvantage of this configuration is that the shared power supply may become too bulky to be conveniently accommodated in the required subsea location such as an SEM.

Figure 4:
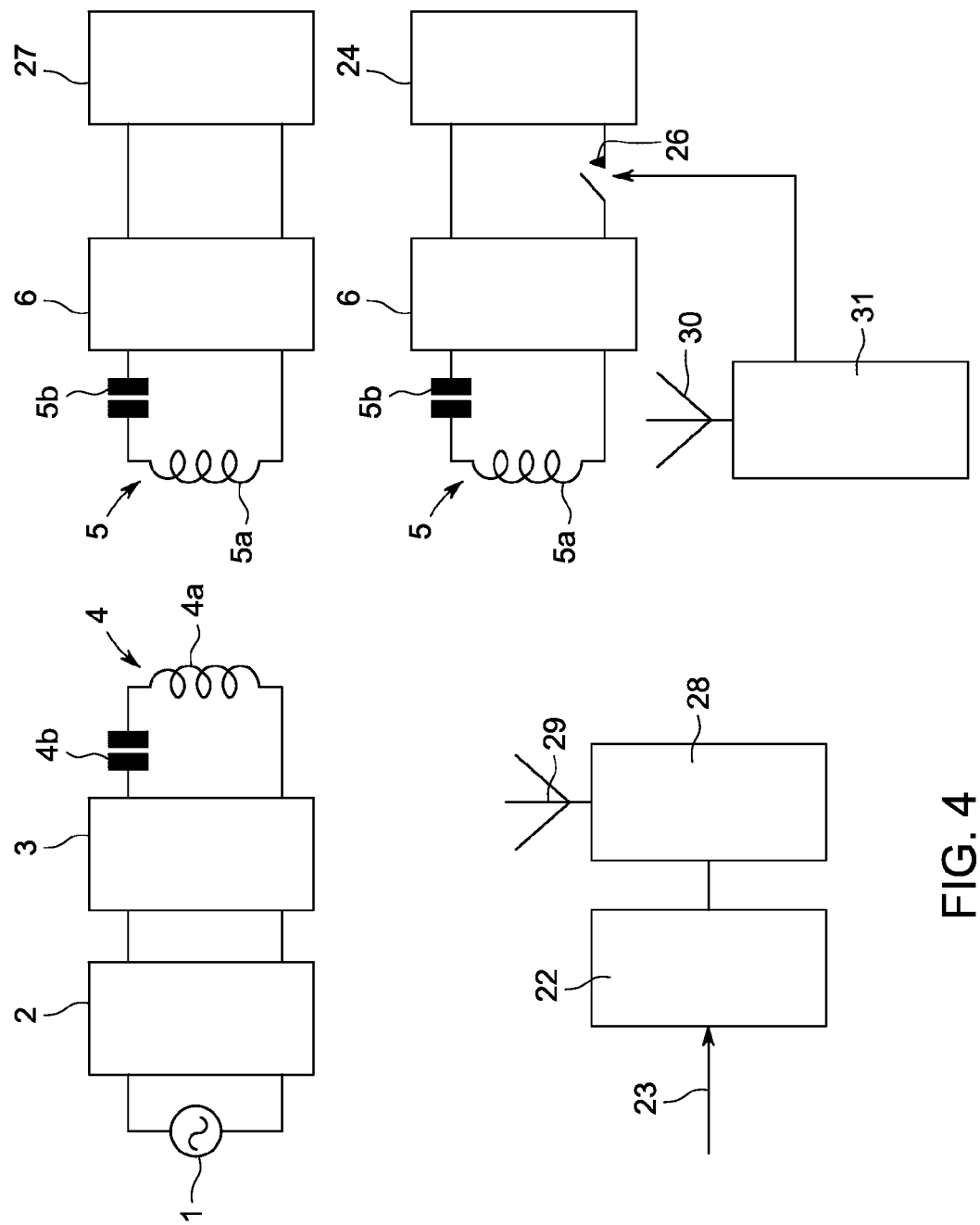
FIG. 4 schematically illustrates a further embodiment of the invention.

A further, alternative arrangement for operating DCVs is to have a common magnetic power supply at a single frequency and operate individual DCVs by a separate independent wireless transmission using a protocol such as Wi-Fi, Bluetooth or wireless USB, etc. Such an arrangement is illustrated in FIG. 4 in which items which correspond with those in FIG. 3 have the same reference numerals as in FIG. 3. As with the FIG. 3 embodiment, a code is generated in a code generating circuit 22 which generates the code appropriate for a specific DCV, according to a demand on line 23 from DCV control circuitry in the SEM. This code is sent to modulate an independent transmitter 28 which sends a modulated transmission via an antenna 29, which transmission is received by an antenna 30 on a receiving, demodulating and decoding circuit 31, which operates the switch 26 when the transmitted code matches that stored in the decoder in the circuit 31. Closing of the switch 26 enables the wireless magnetic power receiver 5, 6 to operate the DCV 24.

In the above embodiments, data from the P/T sensors is also transmitted wirelessly to the SEM using conventional techniques such as Bluetooth, Wi-Fi or wireless USB (Universal Serial Bus) etc.

Figure 5:
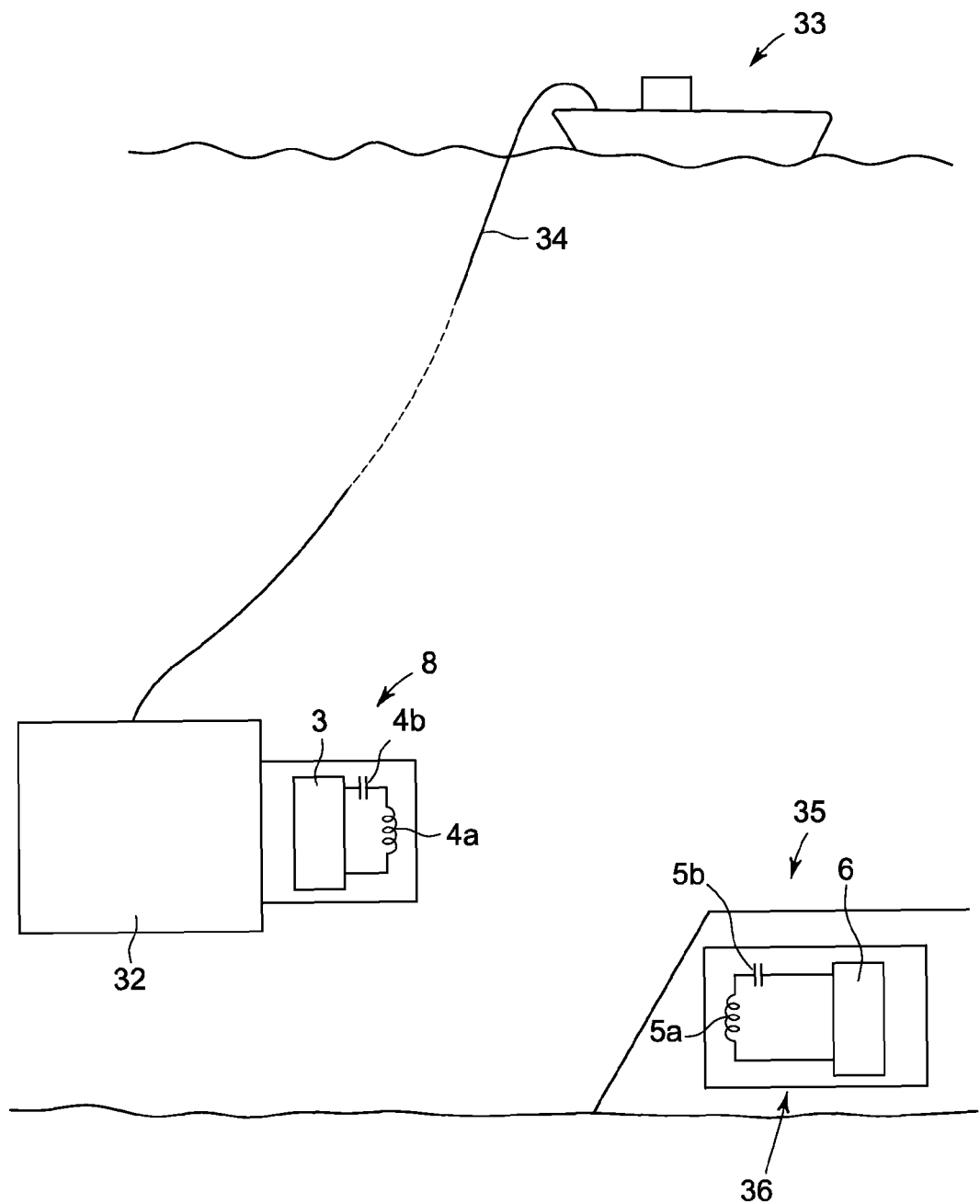
FIG. 5 schematically shows a further embodiment of the invention.

A further embodiment is schematically shown in FIG. 5. Here, a wireless magnetic power supply 8 is located not at a well tree, but instead is carried by a remotely operated vehicle (ROV) 32. In FIG. 5, reference numeral 33 designates a surface vessel and reference numeral 34 designates an umbilical supplying the ROV with power. Also, reference numeral 35 designates a well tree provided with a resonant magnet receiver 36 for co-operating with power supply 8 for providing power for the tree. With this arrangement, subsea devices are able to be powered wirelessly when an ROV 32 is positioned sufficiently close to the device to enable power transfer. Such an arrangement may have various uses, for example if power (e.g. wired power) to a subsea-located device fails, for example due to an umbilical failure, it could be powered via an ROV 32 without the need for removing or changing the wires enabling the well to keep flowing during a platform power outage for example. The device may also be diagnosed and/or tested via the ROV using the power supply equipment 8 or other components (not shown). In addition, equipping an ROV with such power (and communications) pick-ups would allow the ROV greater power and tool availability subsea, since a higher power or further diagnostic tools may be employed than would typically be possible via the umbilical. This could allow the ROV to communicate with, control and monitor the tree in real time.

In a further, related embodiment (not shown), a wireless magnetic power supply 8 may be carried by a diver rather than an ROV.

In a yet further related embodiment (not shown), a wireless magnetic power supply 8 may be provided at a shipside location, i.e. on a vessel, platform or other surface location. This would permit pre-deployment testing to be carried out without connecting wires to the equipment. Such remote powering of the equipment would allow for power and communications, for testing and diagnostics.

Various modifications and alternatives are possible within the scope of the invention. For example, considering the embodiment shown in FIG. 2, it would equally be possible for the transmitters 8, 19 to be located externally to the SEM 9, but remaining within the SCM 10. Such an arrangement may enable the distance between transmitters and receivers to be reduced, and the transfer efficiency consequentially improved.

What is claimed is:

1. A method of supplying electrical power to at least one device at a tree of an underwater fluid extraction well, the method comprising:
    using magnetic resonance coupling for wirelessly transmitting power from a supply to the at least one device, wherein there is a plurality of the at least one device, each device being powered via a respective receiver circuit which can be coupled by magnetic resonance coupling with a transmitter circuit of said supply;
    transmitting a code unique to at least one of the plurality of devices by wireless communication to the receiver circuit of the device, wherein said code is generated according to a demand from control circuitry in a subsea electronics module associated with the tree; and detecting the code at the receiver circuit of the device to cause power to be supplied to the device by magnetic resonance coupling;

wherein the at least one device is a directional control valve that is powered according to the demand on a line from directional control valve control circuitry of the subsea electronics module.

2. The method according to claim 1, wherein power from the supply is modulated by a code unique to at least one of the devices, wherein detection of the code at the receiver circuit of the device causes power to be supplied to the device.

3. The method according to claim 1, comprising a plurality of supplies each resonant at a respective one of a plurality of frequencies and a plurality of devices each powered by a respective receiver circuit resonant at a respective one of said frequencies.

4. The method according to claim 1, wherein the supply is in a subsea electronics module of a subsea control module of the tree.

5. The method according to claim 1, wherein the supply is located externally of the tree.

6. The method according to claim 1, wherein at least one such device is in a subsea control module of the tree.

7. The method according to claim 1, wherein the at least one device is located externally of a subsea control module of the tree.

8. The method according to claim 1, wherein the at least one device comprises a sensor.

9. An apparatus for supplying electrical power to at least one device at a tree of an underwater fluid extraction well, the apparatus comprising:

circuitry configured to use magnetic resonance coupling for wirelessly transmitting power from a supply to the at least one device, wherein there is a plurality of the at least one device, each device being powered via a respective receiver circuit which can be coupled by magnetic resonance coupling with a transmitter circuit of said supply;

wherein a code unique to at least one of the plurality of devices is transmitted by wireless communication to the receiver circuit of the device, detection of the code at the receiver circuit of the device causing power to be supplied to the device by magnetic resonance coupling, and wherein said code is generated according to a demand from control circuitry in a subsea electronics module associated with the tree; and wherein the at least one device is a directional control valve that is powered according to the demand on a line from directional control valve control circuitry of the subsea electronics module.

10. The apparatus according to claim 9, comprising circuitry configured to modulate power from the supply by a code unique to at least one of the devices and circuitry configured to detect the code at the receiver circuit of the device, wherein detection of the code at the receiver circuit of the device causes power to be supplied to the device.

11. The apparatus according to claim 9, comprising a plurality of supplies each resonant at a respective one of a plurality of frequencies and a plurality of devices each powered by a respective receiver circuit resonant at a respective one of the frequencies.

12. The apparatus according to claim 9, wherein the supply is in a subsea electronics module of a subsea control module of the tree.

13. The apparatus according to claim 9, wherein the supply is mounted externally of the tree.

14. The apparatus according to claim 9, wherein the at least one device is in a subsea control module of the tree.

15. The apparatus according to claim 9, wherein the at least one device is located externally of a subsea control module of the tree.

16. The apparatus according to claim 9, wherein the at least one device comprises at least one of a sensor and a directional control valve.

* * * * *